United States Patent [19]

Auer et al.

[11] Patent Number: 4,915,633

[45] Date of Patent: Apr. 10, 1990

[54] TOY ALPHABET SCHOOL BUS

[75] Inventors: Robert T. Auer, East Stroudsburg, Pa.; David W. Reina, Maplewood, N.J.; Richard L. Keats, Sands Point, N.Y.

[73] Assignee: Buddy L Corporation, New York, N.Y.

[21] Appl. No.: 325,943

[22] Filed: Mar. 20, 1989

[51] Int. Cl.$^4$ ............................................. G09B 1/24
[52] U.S. Cl. .................... 434/159; 434/426; 446/449
[58] Field of Search ............... 434/159, 160, 173, 426, 434/195; 446/448, 449; 40/524

[56] References Cited

U.S. PATENT DOCUMENTS

| | | | |
|---|---|---|---|
| 78,361 | 5/1868 | Clay | 434/159 |
| 311,215 | 1/1885 | Webb | 446/449 |
| 843,642 | 2/1907 | Van Halder | 446/449 |
| 2,326,297 | 8/1943 | Harvey | 424/419 |
| 2,401,937 | 6/1946 | Kingson | 446/449 |
| 2,494,362 | 1/1950 | Schatz | 434/426 |
| 2,680,306 | 6/1954 | Moyer | 434/195 |
| 4,222,181 | 9/1980 | Cummings | 434/159 |
| 4,333,255 | 6/1982 | Ward | 40/524 |

*Primary Examiner*—William H. Grieb
*Attorney, Agent, or Firm*—Michael Ebert

[57] ABSTRACT

A user-propelled toy school bus which as it travels along a playing surface exhibits through its side and rear windows the successive letters of the alphabet. These letters are printed along an endless scroll that is guided in a path running behind the windows, each letter being defined by a series of equi-spaced parallel segments. The scroll is so driven by one set of the bus wheels through a unidirectional drive system that as the bus travels in either direction, the scroll always advances continuously in the same direction. Formed on each window is a parallel array of equi-spaced viewing elements. As the scroll advances behind each window, the segments of each letter alternatively move into registration with the viewing elements to expose the letter, and then the interstices between the segments move into registration with the viewing elements to blank out the letter. This shuttering action caues the letters to appear to be advancing in incremental steps and to appear unblurred despite their continuous movement. The interstices between the segments of the letter may have printed thereon the parallel segments of a figure, so that when the latter segments are in registration with the viewing elements on the window, then the figure is exposed.

11 Claims, 4 Drawing Sheets

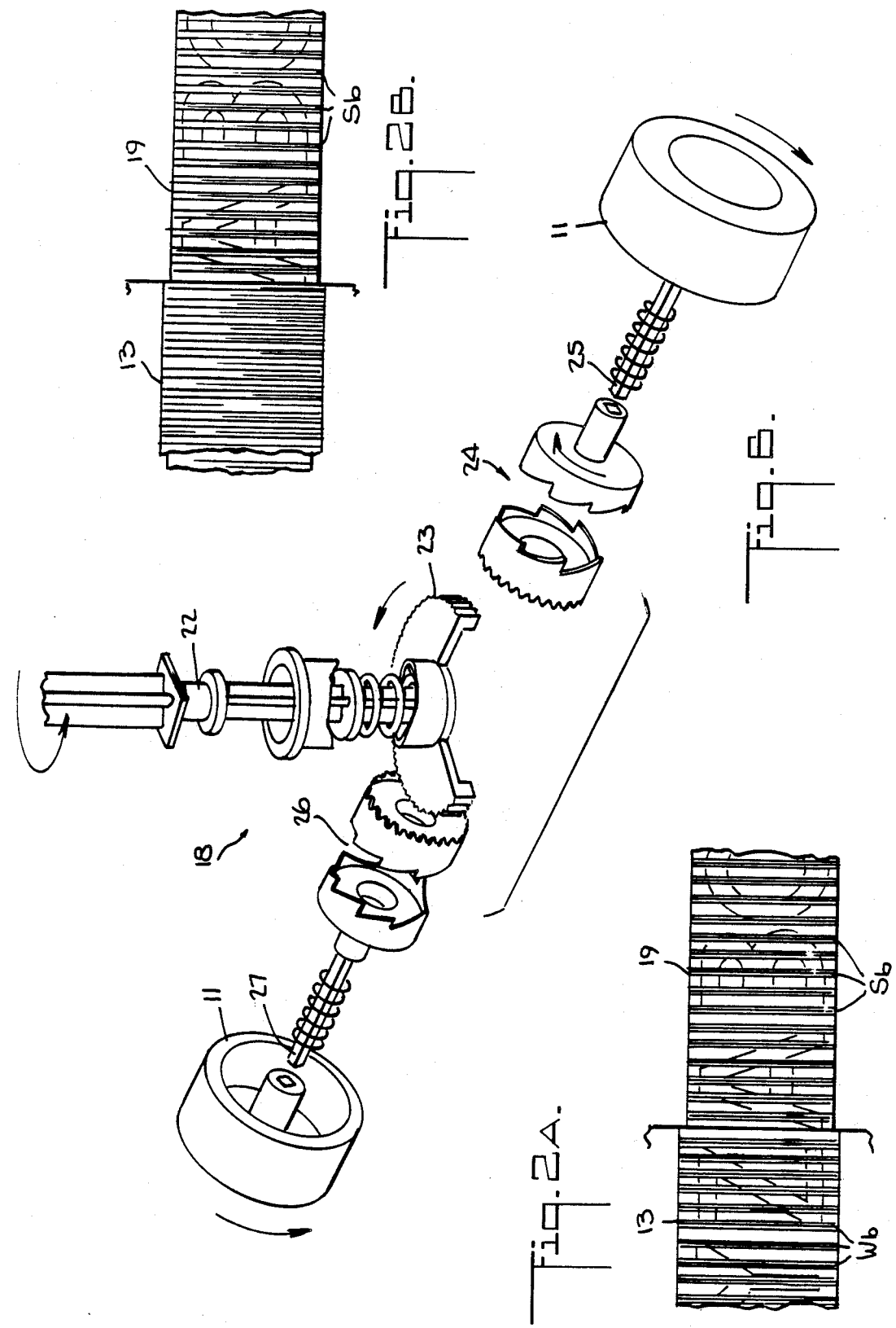

TOY ALPHABET SCHOOL BUS

BACKGROUND OF INVENTION

1. Field of Invention

This invention relates generally to educational toys which display the letters of the alphabet in sequence, and more particularly to a toy of this type which takes the form of a user-propelled school bus that as it travels in the forward or reverse direction, displays through its windows the letters of the alphabet in their normal sequence.

2. Status of Prior Art

An alphabet is a particular set of letters in a customary order with which one or more languages is written. The modern languages of Western Europe and America use the letters of the Roman alphabet, this being derived from the ancient Greek alphabet which in turn is imitative of the Phoenician alphabet. The letters of the Cyrillic alphabet are used in the Russian language, whereas the Hebrew and Arabic languages have their own alphabets.

While the present invention will be illustrated in conjunction with the letters A to Z, it is to be understood that the educational toy disclosed herein is applicable to any known alphabet and is useful in teaching the letters of the alphabet to young children as part of a play experience.

Before one is able to read and write, one must master the letters of the alphabet. Hence, the earliest step in the educational process is learning the alphabet, and this often takes place before formal schooling begins. Since children of pre-school age learn best when learning is an aspect of a play activity, over the years various toys have been developed to present the letters of the alphabet to a player. The classic toy for teaching the letters of the alphabet is a set of construction play blocks on whose faces are printed various alphabet letters.

The letters of the alphabet have also been associated with rolling toys. Thus, the patent to Van Halder, U.S. Pat. No. 843,642, discloses a wheelbarrow toy in which the letters of the alphabet are printed on an endless tape which is drawn across a display window so that as the toy is rolled, the letters appear in succession. Similarly, in the Ward U.S. Pat. No. 4,333,255, the letters of the alphabet are printed on a continuous tape moving behind a display window. In the wheeled toy shown in the Webb U.S. Pat. No. 311,215, the letters of the alphabet are carried on separate cards that are presented in succession as the toy is rolled.

It is also known, as in the patent to Kingston, U.S. Pat. No. 2,401,937, to provide a toy school bus having a top window through which are displayed different scenes carried on a continuous tape. In the Schartz U.S. Pat. No. 2,326,297, a pull toy is provided having an inner cylinder having pictures therein with overlapping ruled lines. The inner cylinder fits within an outer transparent cylinder having ruled lines. As the inner cylinder rotates relative to the outer cylinder, the pictures then appear to be animated because of the shuttering action produced by the ruled lines.

SUMMARY OF INVENTION

In view of the foregoing, the main object of this invention is to provide a user-propelled toy school bus which as it travels along a playing surface exhibits through its side and rear windows the successive letters of the alphabet.

A significant feature of the invention is that the letters are presented in their normal A to Z sequence regardless of whether the toy bus is propelled in the forward or reverse direction. The reason this feature is useful is that a very young child may be able only to push the toy bus as far as his arm will permit; hence, by simply rolling the vehicle back and forth, the child is able to view within a relatively small span the letters of the alphabet in sequence.

More particularly, it is an object of this invention to provide a toy school bus of the above type in which the letters of the alphabet are caused to move continuously as the vehicle is rolled by a player appear to be moving in incremental steps and to be unblurred despite their continuous movement.

Yet another object of this invention is to provide a toy school bus having a top knob which turns as the bus is propelled by a player along a playing surface to cause the letters of the alphabet to appear through windows of the bus, the knob when manually operated making it possible to advance the letters of the alphabet without propelling the bus.

Briefly stated, these objects are attained in a user-propelled toy school bus which as it travels along a playing surface exhibits through its side and rear windows the successive letters of the alphabet. These letters are printed along an endless scroll that is guided in a path running behind the windows, each letter being defined by a series of equi-spaced parallel segments. The scroll is so driven by one set of the bus wheels through a unidirectional drive system that as the bus travels in either direction, the scroll always advances continuously in the same direction. Formed on each window is a parallel array of equi-spaced viewing elements. As the scroll advances behind each window, the segments of each letter alternatively move into registration with the viewing elements to expose the letter, and then the interstices between the segments move into registration with the viewing elements to blank out the letter. This shuttering action causes the letters to appear to be advancing in incremental steps and to appear unblurred despite their continuous movement. The interstices between the segments of the letter may have printed thereon the parallel segments of a figure, so that when the latter segments are in registration with the viewing elements on the window, then the figure is exposed.

BRIEF DESCRIPTION OF DRAWINGS

For a better understanding of the invention as well as other objects and further features thereof, reference is made to the following detailed description to be read in conjunction with the accompanying drawings, wherein:

FIG. 2A illustrates the exposed relationship which exists between the letters of the alphabet printed on an endless scroll and a bus window behind which the scroll runs;

FIG. 2B illustrates the shuttered relationship which later exists between the scroll letters and the bus window;

FIG. 5 is a plan view of the bus with its roof removed to expose the endless scroll and the guide means therefor;

FIG. 6 illustrates, in perspective, the unidirectional drive system for advancing the endless scroll;

DETAILED DESCRIPTION OF INVENTION

Figure 1:
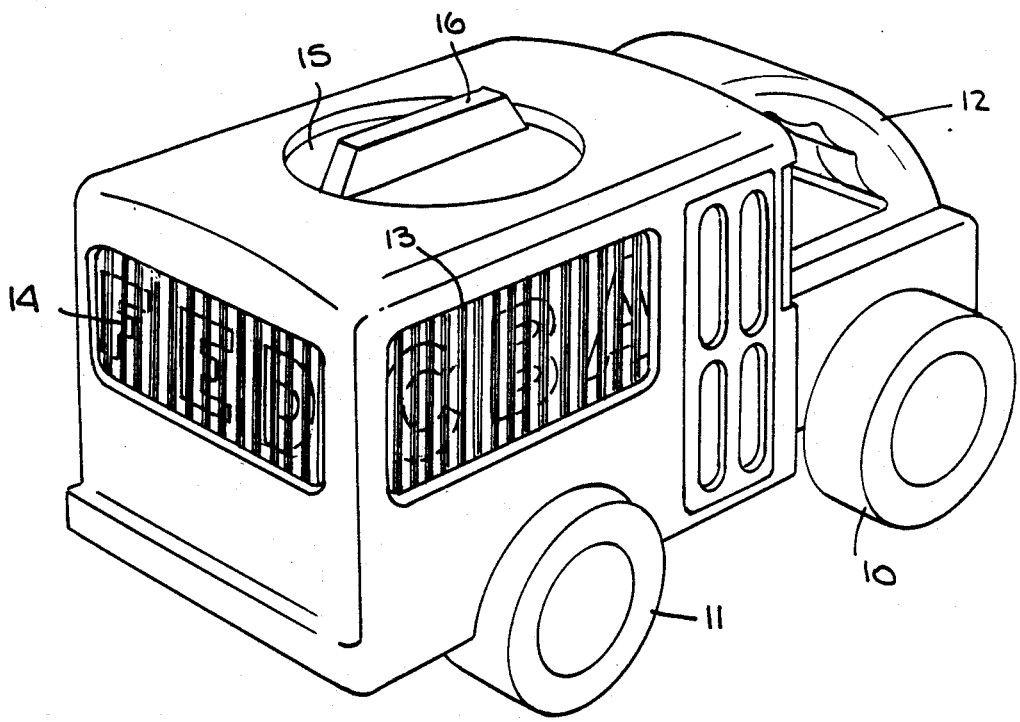
FIG. 1 is a perspective view of one preferred embodiment of a toy alphabet school bus in accordance with the invention.

First Embodiment:

Referring now to FIG. 1, there is shown a toy alphabet school bus in accordance with the invention having a set of front wheels 10, a set of rear wheels 11 and a curved handle which extends from the front bumper of the vehicle to the roof thereof. The bus includes left and right side windows 13 and a rear window 14, the front window or windshield being partially blocked by the handle. The bus has no motor and is propelled in either direction on a playing surface by a child grasping the handle.

Figure 3:
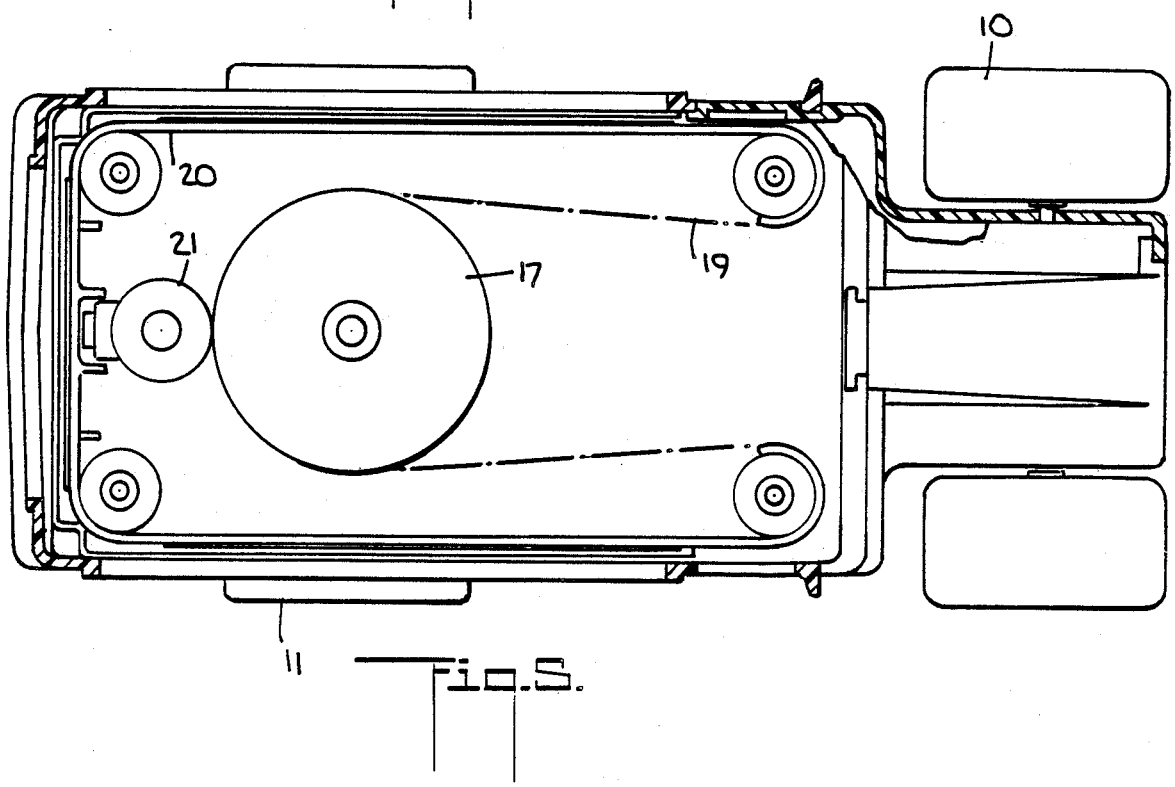
FIG. 3 is a longitudinal section taken through the toy bus.
Figure 3:
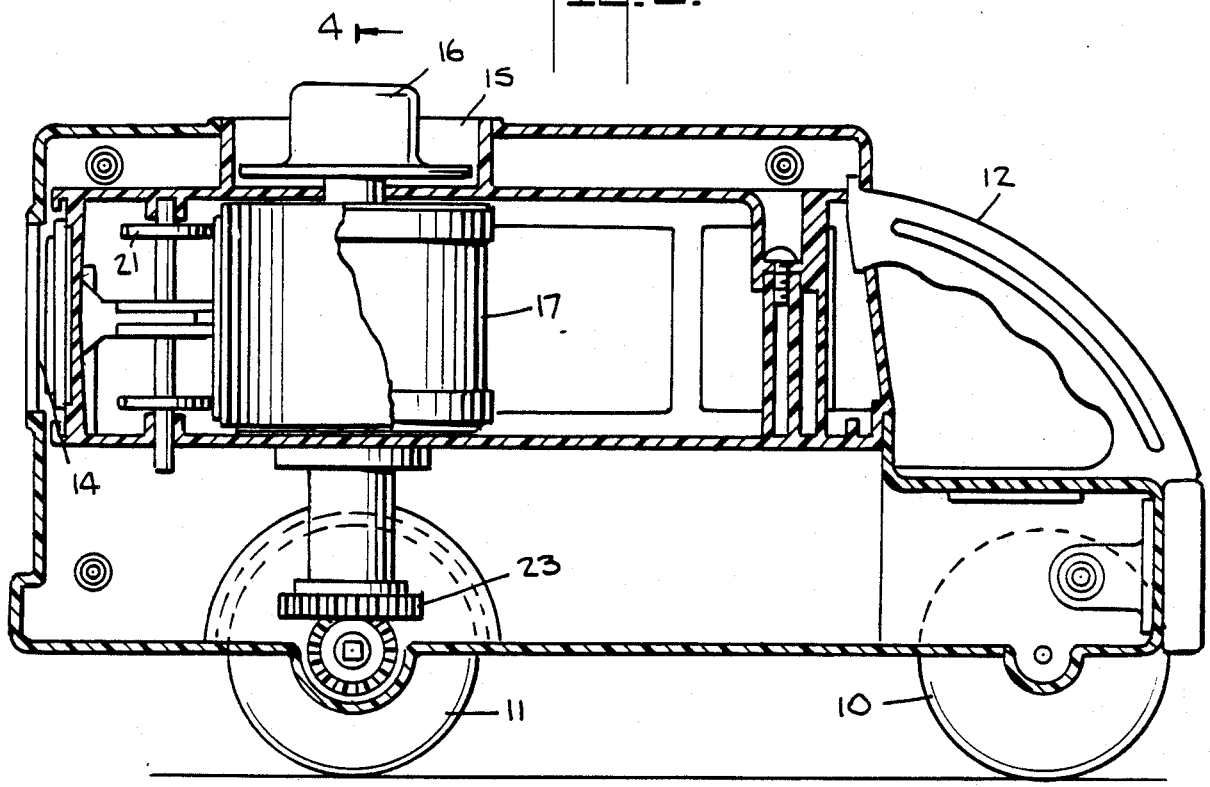
Figure 4:
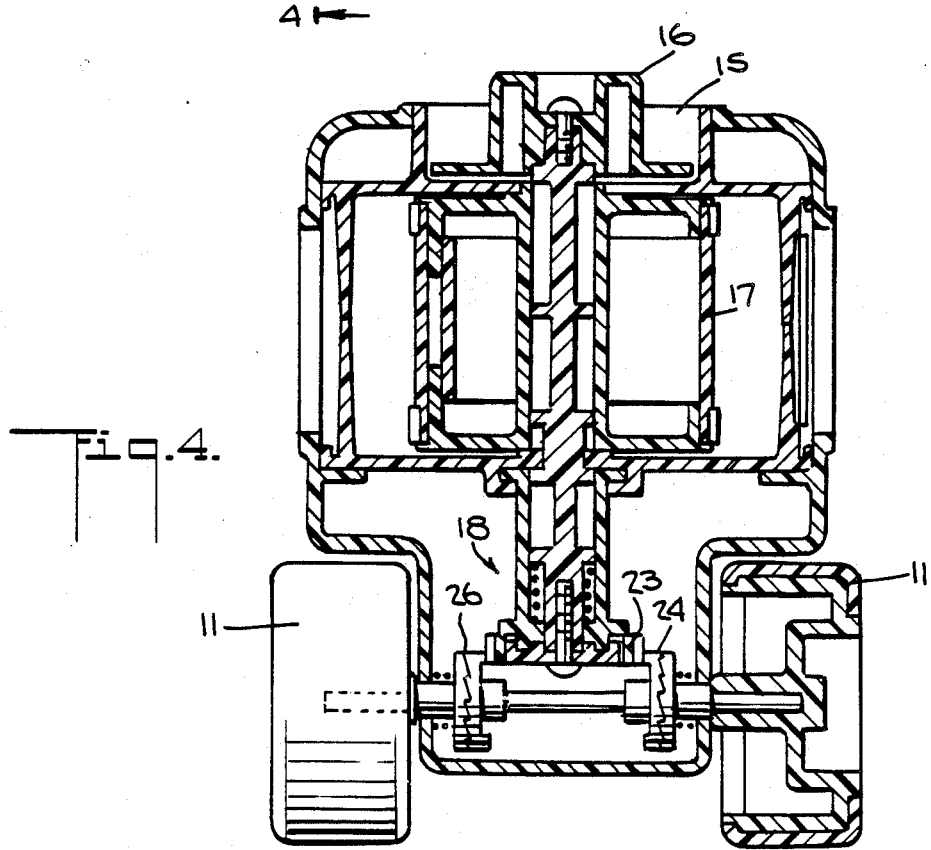
FIG. 4 is a transverse section taken of the toy bus in the plane indicated by line 4—4 in FIG. 3.

The roof of the bus is provided with a circular well 15 within which is disposed a manually-operated knob 16. As shown in FIGS. 3 and 4, knob 16 is coupled to the vertical shaft of a rotatable drum 17 disposed by a unidirectional drive system, generally designated by numeral 18, to rear wheels 11, so that as the bus is rolled in either direction on a playing surface, the drum is always caused to turn in the counterclockwise direction.

A best seen in FIG. 5, drum 17 acts to drive an endless scroll 19 in a path defined by a U-shaped guide 20 behind the left and right side windows 13 and rear window 14, the long legs of guide 20 being parallel to the side windows and the short leg of the guide being parallel to the rear window. To prevent slippage of scroll 19 as the drum turns, it is pressed against the drum by a pressure roller 21.

Endless scroll 19, as shown in FIGS. 2A and 2B, has printed thereon the letters A to Z in sequence, so that the letter Z is immediately followed by the letter A, as the scroll is advanced cyclically to present the letters of the alphabet in their customary order. Printed over the letters of the alphabet on the scroll is an endless grating of equi-spaced parallel bars Sb. Printed, etched or screened on side windows 13 and on rear window 14 is a parallel array of equi-spaced opaque bars Wb, each having a width equal to the space between scroll bars Sb.

Hence, as drum 17 turns clockwise, it acts to advance scroll 19 to move the successive letters of the alphabet across the side window 13 on the left side of the bus, the letters then travelling toward the rear of the bus where the letters move across the rear window 14, and from there across the side window 13 on the right side of the bus. Thus, each letter makes a full circuit of these windows.

In the course of continuous scroll movement behind the windows a shuttering action takes place in which alternately the bars Sb which have the same width as the bars Wb on the windows first lie behind the window bars in registration therewith and then lie in registration with the interstices between the window bars, as shown separately in FIGS. 2A and 2B.

As a consequence of this shuttering action, the letters of the alphabet are first exposed through the side and rear windows, and then these windows are effectively rendered opaque. This action occurs at a rate that depends on the speed of bus movement. Hence the player can at will cause the letters to advance slowly or quickly.

Even though the scroll and the letters thereon advance continuously, because of this shuttering action in which the letters are intermittently exposed in the course of advance, the letters appear to advance in incremental steps and appear unblurred regardless of how fast the bus is running. Thus, at any one instant when the letters are exposed, they occupy particular positions behind the windows, and when after the windows are rendered opaque, the letters are again exposed, they occupy new positions in advance of their previous positions.

The unidirectional drive system 18 for drum 17 is shown in FIG. 6, where it will be seen that mounted on drum shaft 22 below the drum is a drive gear 23, one side of which is engaged by a unidirectional clutch assembly 24 coupled to the axle 25 of the right wheel 11. Drum gear 23 is engaged on its diametrically opposed side by a unidirectional clutch assembly 26 coupled to the axle 27 of left wheel 11.

Clutch assemblies 24 and 26 are each provided with cooperating pawl teeth that are inversely related to each other so that if the right and left wheels are both turning clockwise, only clutch assembly 24 is engaged, and rotation of right wheel axle 24 will then cause drum gear 23 to turn counterclockwise through the engaged clutch assembly 24, clutch assembly 26 being then disengaged. But if now wheels 11 are both turning counterclockwise, then only clutch assembly 26 will be engaged so that now rotation of left wheel axle 27 is transmitted to drum gear 23 to cause this gear to turn counterclockwise. Hence, regardless of whether the bus is propelled in the forward or reverse direction, the drum will be caused to turn counterclockwise to advance the scroll to present the letters of the alphabet in their normal A to Z sequence.

If, therefore, the child playing with the bus moves the bus back and forth in short strokes, the letters of the alphabet will nevertheless be presented in their normal A to Z sequence. And if the player wishes to see the letters of the alphabet in sequence without having to roll the bus on a playing surface, this can be done by turning knob 16.

While there has been shown and described a preferred embodiment of a toy alphabet school bus in accordance with the invention, it will be seen that many changes and modifications may be made therein without, however, departing from the essential spirit thereof. Thus, the vehicle need not be in a school bus configuration but may be in other vehicle formats having windows to display the letters of the alphabet. In practice, the scroll may be formed of translucent film material and the bus may be provided internally with a battery-operated bulb to illuminate the scroll.

Figure 7:
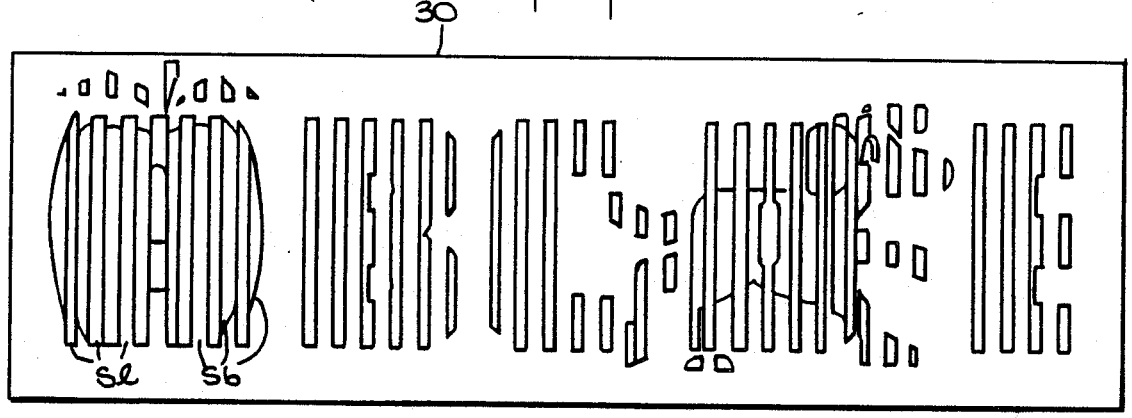
FIG. 7 illustrates a portion of a scroll included in a second embodiment of the invention.

Second Embodiment:

In this embodiment, the user-propelled toy school bus is provided, as shown in FIG. 7, with a scroll 30 which has printed thereon the successive letters of the alphabet, some of which are interlaced with a figure appropriate to the letter.

Thus the letter A is formed by a series of equi-spaced parallel segments Sl. Interlaced with letter A is the figure of an apple formed by segments Sf which are disposed in the interstices between the letter A segments. Hence it is not apparent to one who directly views the scroll just what is being shown, for the composite form is neither a figure nor a letter.

In the case of letter D, interlaced between the segments of this letter are segments forming the figure of a dog. Letters B, C and E are each also formed by parallel segments, but the interstices of these segments are occupied by black bars as in the scroll shown in the first embodiment. In practice, however, these letters may also be interlaced with figures.

The figure is dictated by the first letter of its spelling, which is why apple is the figure for letter A, and dog is the figure for letter D.

The bus arrangement is essentially the same as in the first embodiment; for as the alphabet bus travels scroll 30 is advanced continuously behind windows. But in this instance, after letter A is presented to view, this is followed by the presentation of the figure of an apple, letter A being blanked out when the apple is exhibited. This successive relationship also applies to all other letters of the alphabet having figures interlaced therewith.

Figure 8:
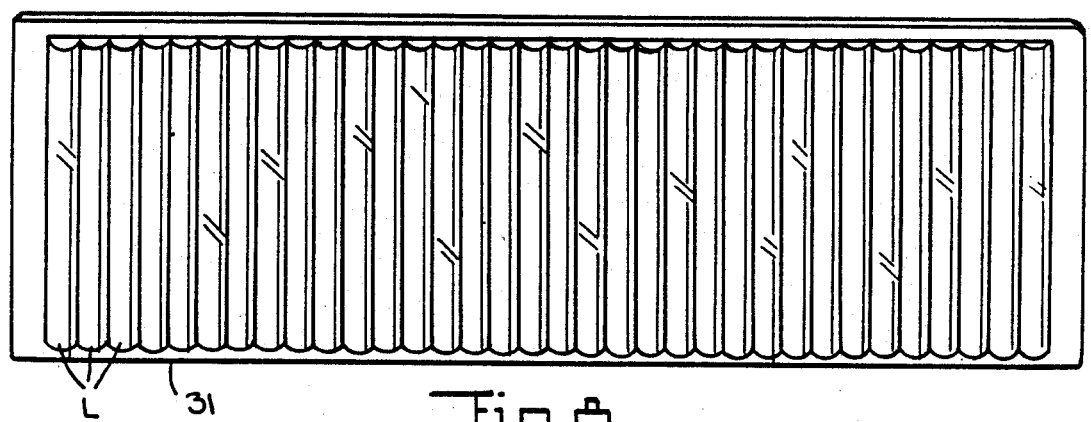
FIG. 8 shows the window used with this scroll.

In order to see first a letter and then a figure, or first a letter and than a blank, the windows of the school bus, as shown by window 31 in FIG. 8, are in a Fresnel-like formation. In a conventional Fresnel lens, a concentric series of simple lenses is provided with short focal lengths to form a relatively thin multiple lens of large diameter.

Figure 11:
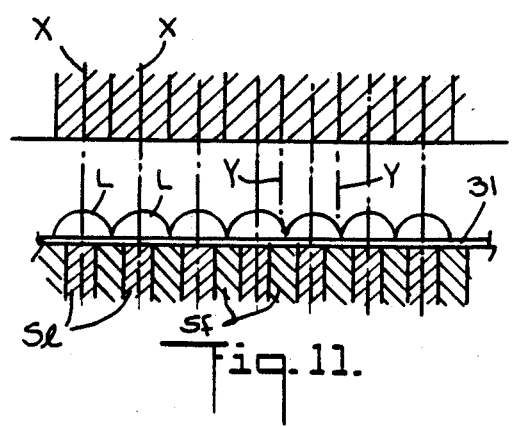
FIG. 11 schematically illustrates the optical relationship between the window viewing element and the scroll.

Window 31 is provided with a parallel array of semi-cylindrical, simple convex lenses L, each having an optical axis $\overline{X}$, as shown in FIG. 11. The outer surface of the window is therefore corrugated.

The width of each lens L is twice that of a scroll segment. Hence when, as shown in FIG. 11, the segments Sl of a letter are in registration with the optical axis X of lens L, then the segment Sf of the figure interlaced with the letter segments are in registration with the axis Y passing through the junctions of the lenses.

When the parallel segments Sl of a particular letter are in registration with the optical axis X of the array of lenses L on window 31, these segments are magnified to twice their width, thereby presenting to the viewer enlarged segments Sl. These segments have no interstices between, for they are in abutting relationship.

Figure 9:
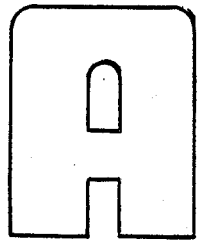
FIG. 9 shows letter A as it appears when exposed by viewing elements incorporated in the window.
Figure 10:
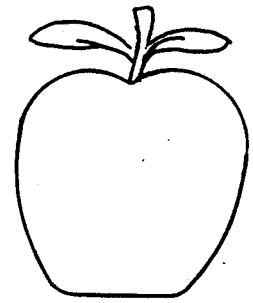
FIG. 10 shows the figure of an apple which is interlaced with letter A on the scroll, the apple being exposed to view.

Thus in the case of letter A, in FIG. 7, this letter as printed on the scroll is formed of segments Sl. But as seen by the viewer, as shown in FIG. 9, letter A is integrated and is no longer formed of segments.

Thus in the first embodiment, the viewing elements are the transparent spaces between the equi-spaced opaque bars on the window. As a consequence, when a segmented letter on the scroll is in registration with the viewing elements, one then sees the letter in its segmented form. But in the case of the second embodiment in which the viewing elements are magnifying lenses on the window, when the segmented letters or figures printed on the scroll are presented, they are seen in integrated form.

While the invention has been described in connection with the display of the letters of the alphabet, it is also applicable to the display of animate or inanimate objects such as animals, boats, cars, people and scenes of various sorts. The term "playing surface" as used herein refers to any surface on which the toy vehicle can be propelled, and this could be a floor, a table, a sidewalk or any other surface on which it is possible for a child to propel the vehicle.

I claim:

1. An educational toy vehicle comprising:
 A a vehicle having a set of wheels and a body having at least one window;
 B an endless scroll guided for movement within the body in a path running behind the window, said scroll having printed thereon the letters of an alphabet in sequence and having superposed on the letters an endless grating of equi-spaced parallel bars, said window having formed thereon an array of equi-spaced parallel opaque bars; and
 C means operatively coupling the scroll to said set of wheels whereby the scroll is caused to advance continuously across said window as the vehicle is propelled on a playing surface in the course of which the scroll bars alternately first lie in registration with the window bars to expose the letters and then lie in registration with the interstices of the window bars to effectively render the window opaque, whereby the exposed letters on the continuously advancing scroll appear to be advancing in incremental steps.

2. A vehicle as set forth in claim 1, wherein said vehicle is in the form of a school bus having side and rear windows behind which said scroll is guided, each window having an array of bars formed thereon.

3. A vehicle as set forth in claim 1, wherein said scroll is operatively coupled to said set of wheels by a unidirectional drive system which causes said scroll to advance the letters unidirectionally in their normal sequence regardless of the direction in which the vehicle is propelled.

4. A vehicle as set forth in claim 1, wherein said scroll is supported on a drum operatively coupled to said set of wheels and is prevented from slipping on said drum by a pressure roller.

5. A vehicle as set forth in claim 4, wherein said vehicle is provided with a manual knob which is coupled to said drum to permit an operator to turn the drum and advance the scroll when the vehicle is not propelled.

6. A vehicle as set forth in claim 1, further including a handle making it possible for a player to propel the vehicle.

7. A vehicle as set forth in claim 3, wherein said scroll is supported on a drum mounted on a shaft and said system includes a gear mounted on the drum shaft and engaged at diametrically-opposed positions by a pair of inversely related clutch assemblies each coupled to one of the wheels in the set, whereby when the vehicle is propelled in one direction, rotation of only one of the wheels is transmitted by one of the assemblies to the drum to turn it in a given direction; and when the vehicle is propelled in the reverse direction, rotation of the other wheel is transmitted to the drum by the other assembly to turn it in the same direction.

8. An educational toy vehicle comprising:
 A a vehicle having a set of wheels and body having at least one window;
 B an endless scroll guided for movement within the body in a path running behind the window, said scroll having printed thereon the letters of an alphabet in sequence, each letter being defined by a series of equi-spaced segments, said window having formed thereon a parallel array of equi-spaced viewing elements; and C means operatively coupling the scroll to said set of wheels whereby the scroll is caused to advance continuously across said window as the vehicle is propelled on a playing surface in the course of which the segments of each letter alternately first lie in registration with the viewing elements to expose the letter, and then the interstices between the segments lie in registration with the viewing elements to blank out the letter, whereby the exposed letters on the continuously advancing scroll appear to be advancing in incremental steps.

9. A vehicle as set forth in claim 8, wherein said viewing elements on the window are constituted by an array of parallel lenses whose optical axes when in registration with the letter segments expose the letter to view.

10. A vehicle as set forth in claim 9, wherein said lenses magnify the width of the letter segments to exhibit an integrated letter.

11. A vehicle as set forth in claim 8, wherein the interstices of the segments of a letter are occupied by segments forming a figure whereby the letter and figure are interlaced, and the window exhibits first the letter and then the figure.

* * * * *